United States Patent Office 3,559,349
Patented Feb. 2, 1971

3,559,349
FACETING MACHINE
Takahiro Imahashi, 533 Hino, Hino, Tokyo, Japan
Filed Dec. 31, 1968, Ser. No. 788,160
Claims priority, application Japan, Jan. 25, 1968,
43/4,397
Int. Cl. B24b 19/00
U.S. Cl. 51—229                                                    7 Claims

ABSTRACT OF THE DISCLOSURE

A faceting machine according to the present invention is capable of automatically setting different cutting angles or polishing angles of different facets. The faceting machine includes a stationary protractor, an angle setting plate rotatable on the surface of the protractor about a shaft, a fastening means to fasten the angle setting plate to said protractor at a desired angular position, and a bearing block rotatably carrying a faceter spindle and secured to said shaft. The faceter spindle is swingable on the surface of the angle setting plate about the shaft while being rotatable about its own axis. The faceter spindle has a dop stick axially secured to one end thereof for holding a gemstone being cut or polished and a cam block secured to the opposite end thereof. The cam block rotates together with said faceter spindle and has a circular cross section at a portion thereof and non-circular cross sections at other portions thereof. The angle setting plate has a cam follower to be secured thereto at a selected position thereof so as to be kept in contact with the peripheral surface of said cam block.

---

This invention relates to a faceting machine for faceting gemstones of complicated cut, e.g. oval cut and marquise cut, which is capable of automatic setting of cutting angle and preforming of gemstones of various sizes.

For grinding each facet of a gemstone, various faceting machines of different types have heretofore been used. With any of known faceting machines, the cutting angle has to be indexed and adjusted for cutting each facet, and it cannot be done automatically. Furthermore, rough shaping or preforming of gemstones cannot be done with a single machine without removing them from faceting machine. The setting of the cutting angle and preforming operations have been done manually, and accordingly, special skill and long experience and troublesome procedures have been necessary to accurately cut the gemstones for shaping them properly. In short, it has been very difficult to cut and shape gemstones in a quick and efficient manner.

Therefore, an object of the present invention is to obviate the aforesaid difficulties of known faceting machines and cutting procedures. According to the present invention, there is provided an improved faceting machine comprising a faceter spindle having a cam secured thereto, and an angle setting plate pivotally holding the faceter spindle and having a cam follower mounted thereon, which cam follower is kept in contact with the cam, whereby cutting angle can be set automatically as the faceter spindle is rotated by a desired index. By selecting proper configuration of the cam, preforming of gemstones can also be accomplished with the faceting machine of the invention. As a result, the operator can accurately cut gemstones without necessitating any special skill. For instance, in known faceting machines, it is necessary to modify the angle of the faceter spindle for faceting each facet of the same series of a gemstone, such as star facets or main facets, and the desired angle of each facet cannot be obtained unless it is adjusted for each faceting. On the other hand, with the faceting machine of the present invention, each of the facets of the same series can be cut simply by turning the faceter spindle by a required angle while urging it to a cam follower, thanks to the operative engagement between the cam and the cam follower. With such turning of the faceter spindle, the cutting angle can be set automatically.

In order to provide accurate cutting angle automatically, a preferred embodiment of the faceting machine of the present invention includes a special cut-angle setting mechanism consisting of a protractor mounted at a corner of a triangular faceter frame, an angle setting plate having a hollow shaft pivotally secured to the protractor, an adjusting pin projecting from the angle setting plate and extending through an arcuate slot of the protractor, a pinion gear rotatably fitted on said adjusting pin, an angle setting nut threadedly fitted on said adjusting pin and a sector gear secured to the lower end of the protractor and having a center of pitch circle lying on the axis of the shaft of the angle setting plate and teeth meshed with the pinion gear fitted on the adjusting pin. The cut-angle setting mechanism further includes bearing means for supporting the faceting spindle, which bearing means is pivotally secured to the shaft of the angle setting plate, a dop stick secured to the lower end of the faceter spindle, a special cam block secured to the upper end of the faceter spindle, an index gear mounted at an intermediate portion of the faceter spindle, and an upper cam follower secured to the angle setting plate so as to be selectively engageable with the upper and lower surfaces of the cam block, respectively.

With the cut-angle setting mechanism of such construction, the angular position of the faceter spindle relative to a vertical changes automatically with the rotation of the faceter spindle about its own axis, depending on the configuration of the cam block, so that the desired angle of the faceter spindle relative to a vertical, i.e. the desired cutting angle, can be achieved automatically as the faceter spindle rotates about its own axis. Thus, the cut-angle for each facet of the same series can be easily set without any special skill. The cut-angle for different series of facets can be also easily set by releasing the angle setting nut and moving the adjusting pin along the arcuate slot, for instance, by rotating the pinion gear with a thumb.

For a better understanding of the invention, reference is made to the accompanying drawings, in which.

Like parts and members are designated by like numerals and symbols throughout the drawings.

Figure 5:
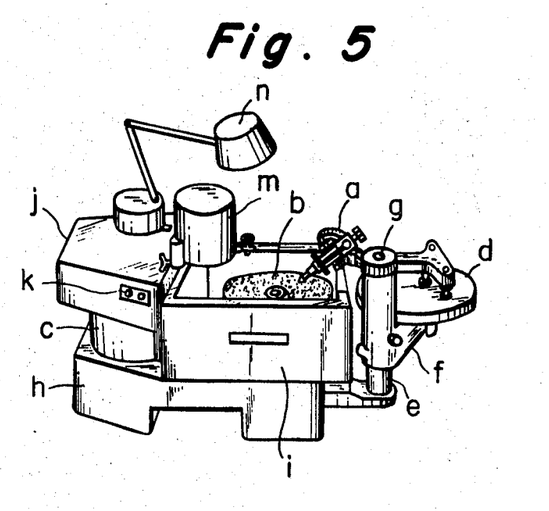
FIG. 5 is a schematic perspective view of a device for cutting and polishing gemstones, in which a faceting machine according to the present invention can be used.

Referring to FIG. 5, a faceting machine *a* according to the present invention cooperates with a lap *b* driven by a motor *c* for cutting or polishing a gemstone held at the tip of a faceter spindle of the faceting machine *a*. The faceting machine *a* is usually placed on a horizontal faceter table *d* secured to a faceter table bracket *f*, which vertically reciprocates along a faceter table column *e*, and a micrometer dial *g* is preferably formed integrally with the faceter table bracket *f* and the faceter table column *e*. The motor *c* is mounted on a body case *i* located on a foot frame *h* and covered by a motor cover *j*, and a switch *k* controls the operation of the motor *c*. A lamp *n* illuminates the surface *f* the lap *b* and a drip can *m* is provided for supplying cooling liquid to the surface of the lap *b*.

Referring to FIGS. 1 to 4, the faceter machine *a* according to the present invention includes a triangular faceter frame 1 having three adjusting legs 2, 3, and 4 adjustably fitted at three corners of the frame 1. A stationary protractor 5 is integrally secured to one corner of the triangular frame 1, so as to extend away from the frame 1. In the particular embodiment of the invention, as illustrated in the figures, the stationary protractor 5 is a vertical plate of sector-shape, and has a circular through hole 5*b* bored therethrough at the vertex of the sector-shape. Graduations 27 inscribed on the protractor 5 cooperate with a pointer, as will be described hereinafter. An angle setting plate 6 is pivotally mounted on one side surface of the vertical stationary protractor 5 by a hollow shaft 6*a* integrally formed therewith. The hollow shaft 6*a* rotatably fits in the through hole 5*b* of the protractor 5, and a nut 6*b* engages the threaded end portion of the hollow shaft 6*a*, so that the angle setting plate 6 is pivotally secured to the protractor 5. An arcuate slot 9 is bored through the protractor 5 along the upper periphery thereof with its center of curavture lying on the axis of the through hole 5*b*, so that an adjusting pin 8 secured to the upper end of the angle setting plate 6 can be slidably fitted in the arcuate slot 9. A pinion gear 10 is fitted on the adjusting pin 8, and the pinion gear 10 comes in contact with the opposite side surface of the protractor 5. The adjusting pin 8 has its tip portion threaded, and an angle setting nut 11 engages the thus threaded portion of the adjusting pin 8 so as to selectively hold the angle setting plate 6 and the pinion gear 10 at a desired angular position relative to the protrctor 5 by urging them against the opposite surface of the protractor 5 by turning the nut 11.

A sector gear 12 is secured to the protractor 5 by screws 12*a* in such manner that the center of its pitch circle lies on the axis of the through hole 5*b*. The teeth of the sector gear 12, formed on the arcuate periphery thereof, mesh the pinion gear 10 fitted on the adjusting pin 8, and the swing of the angle setting plate 6 about the axis of the through hole 5*b* is guided by the engagement between the pinion 10 and the sector gear 12. A bearing 14 for rotatably supporting a faceter spindle 13 has a shaft 7 integrally secured thereto. The shaft 7 coaxially fits in the hollow shaft 6*a* of the angle setting plate 6, so as to allow the bearing 14 and the faceter spindle 13 to swing about the axis of the hollow shaft 6*a* as well as about that of the through hole 5*b* of the protractor 5. The free end of the shaft 7 is threaded, and a nut 7*b* is mounted on the thus threaded portion with a washer 7*c* inserted therebetween. Consequently, the bearing 14 is rotatably connected both to the angle setting plate 6 and to the protractor 5. A dop stick 15 can be secured to the lower end of the faceter spindle 13, and a special cam block 16 is secured to the upper end of the spindle 13 by a screw 13*a*, and an index gear 17 is secured to the intermediate portion thereof by a screw 17*a*. An upper cam follower 18 and a lower cam follower 19 are slidably mounted on the angle setting plate 6, so as to face the cam 16 from opposite directions.

In the figures, 20 and 21 represent cam follower set bolts to set the cam followers 18 and 19 at desired positions, respectively, and a gemstone 22 is secured to the dop stick 15 by a suitable known means, such as by using wax. The angle setting plate 6 has a pair of parallel guide grooves 18*c* and 19*c*, to guide the movement of the cam follower 18 and 19, respectively. The cam followers 18 and 19 are movable substantially in parallel with the axis of the faceter spindle 13. Tapped holes 20*a* and 21*a* are formed on the bottom wall of the guide grooves 18*c* and 19*c*, and the cam follower set bolts 20 and 21 engage such tapped holes so as to selectively hold the cam followers 18 and 19 at desired positions, respectively, by urging them against the angle setting plate 6 by the engagement of the set bolt and the tapped hole. A series of graduations 18*a* are inscribed on the upper surface of the cam follower 18, and a single reference graduation 18*b* is provided on the upper edge of the angle setting plate 6, so that the position of the cam follower 18 relative to the angle setting plate 6 can be indicated by the graduations 18*a* and the reference graduation 18*b*. Similar graduations (not shown) and reference graduation (not shown) are inscribed on the lower surface of the lower cam follower 19 and the lower edge of the angle setting plate 6, so as to indicate the position of the lower cam follower 19 relative to the angle setting plate 6.

Figure 6:
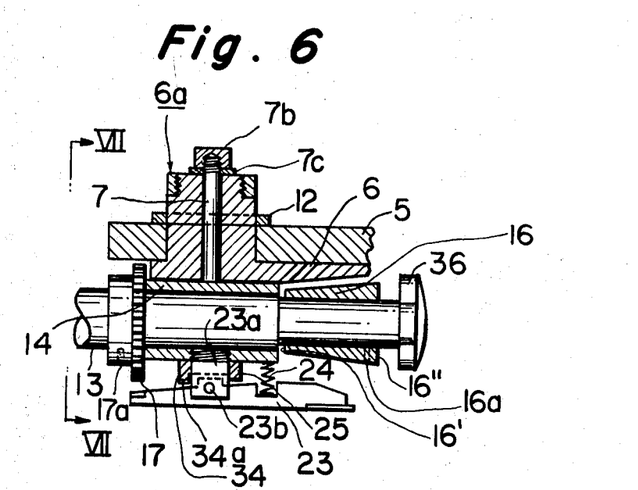
FIG. 6 is a sectional view taken on the line VI—VI of FIG. 1A.

A trigger bolt 23*a* is threadedly secured to the faceter spindle bearing 14, in alignment with the shaft 7, so as to extend away from the protractor 5. A trigger lifter 25 is rotatably fitted on the trigger bolt 23*a*. The tip of the trigger bolt 23*a* is bifurcated, and a trigger 23 is pivotally connected to the thus bifurcated portion of the trigger bolt 23*a* by a bolt or pin 23*b*. A trigger spring 24 is inserted between the bearing block 14 and the trigger 23 to bias the trigger 23 clockwise, as seen in FIG. 6. In other words, the left-hand end of the trigger 23 normally engages one of teeth formed on the periphery of the index gear 17, unless the trigger lifter 25 is actuated, as will be described hereinafter.

A pointer 26 having a single graduation 26*a* is secured to the bearing 14. It is also possible to inscribe vernier graduations on the pointer 26 instead of the single line 26*a*. The pointer 26 slides along the graduations 27 inscribed on the peripheral surface of the protractor 5, so as to indicate the inclination of the faceter spindle 13.

Figure 10A:
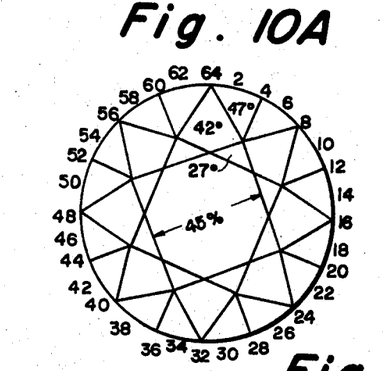
FIGS. 10A to 10C are a top view, an elevation, and a bottom view, respectively, illustrating a standard brilliant cut gemstone.
Figure 10B:
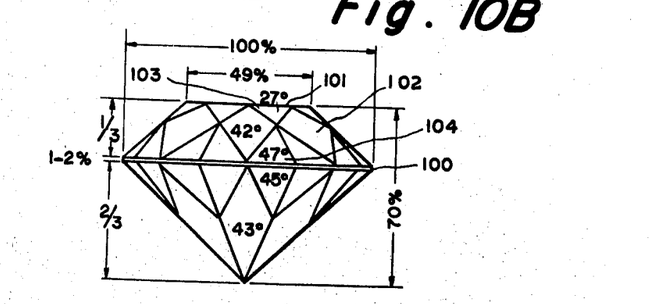
Figure 10C:
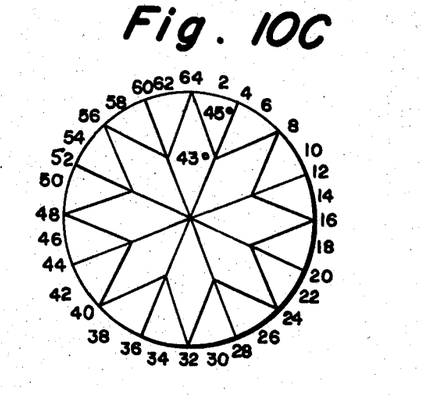
Figure 11A:
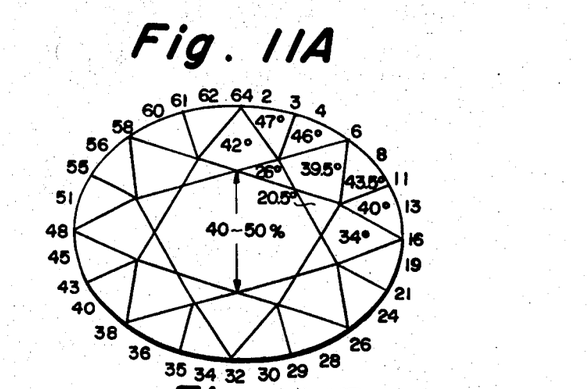
FIGS. 11A and 11C are a top view, an elevation, and a bottom view, respectively, illustrating a brilliant oval cut gemstone.
Figure 11B:
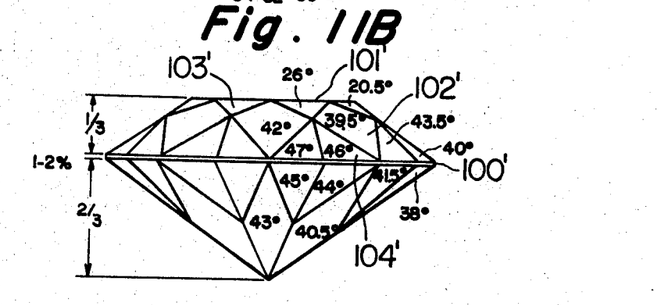
Figure 11C:
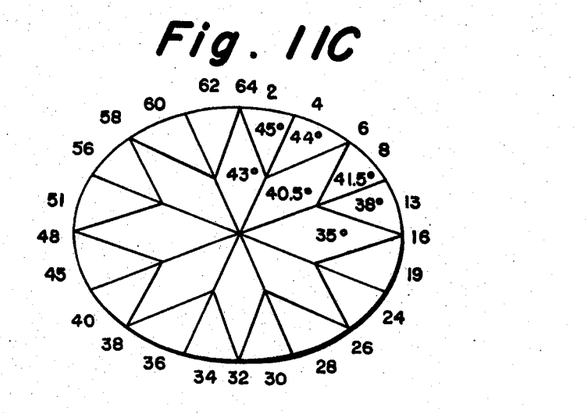

The faceting machine according to the present invention, which has the aforesaid construction can be used both for preforming and faceting a gemstone and for polishing it. The process for polishing the gemstone is substantially identical to the process of cutting it, except that the kind of lap *b* and abrasive used on the lap *b* are different. Accordingly, only the cutting operation will be described in detail, hereinafter. For simplicity, the operation of the faceting machine according to the present invention will be explained referring to a standard brilliant cut, as shown in FIGS. 10A to 10C, and to a brilliant oval cut, as shown in FIGS. 11A to 11C. However, it should be understood that the application of the faceting machine of the present invention is not limited to such cuts, but the faceting machine can be applied to various other types of gemstone cutting and polishing, such as a marquise cut and pendeloque cut.

I. Standard brilliant

FIGS. 10A to 10C illustrate various facets of a standard brilliant cut gemstone. In the figure, numerals along the circular periphery represent the sequential number of a specific tooth of the index gear 17 to be engaged with the trigger 23, as will be described in detail hereinafter. The angle represents the inclination of each facet relative to a horizontal plane or a plane of the girdle. The percentage represents the length of each part, based on the diameter of the girdle.

I(1) Girdle cutting.—In standard brilliant cut, the girdle 100 is circular, and accordingly, it is sufficient to hold the faceter spindle 13 horizontally and to rotate the dop stick 15 about the axis of the faceter spindle 13. The graduations 27 on the protractor 5 are so selected that when the pointer graduation 26a meets the 90 degree line of the graduations 27, the faceter spindle 13 is kept horizontal.

Figure 3:
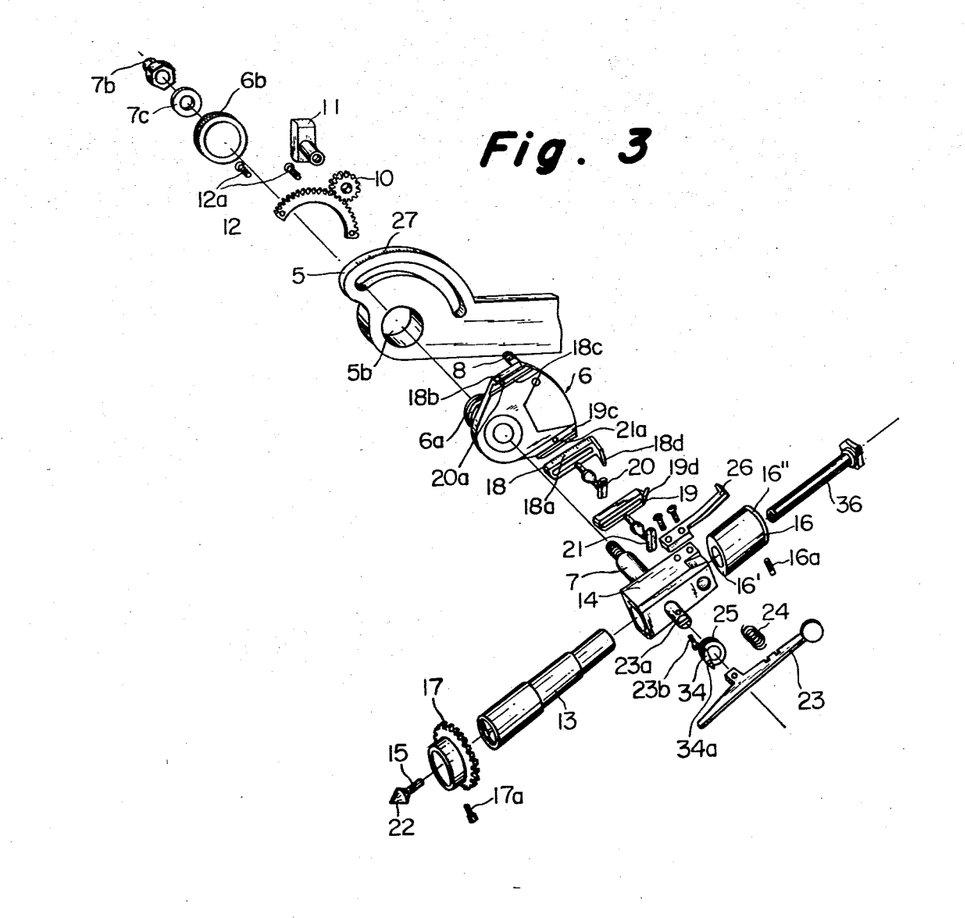
FIG. 3 is an exploded view of the faceting machine.
Figure 4:
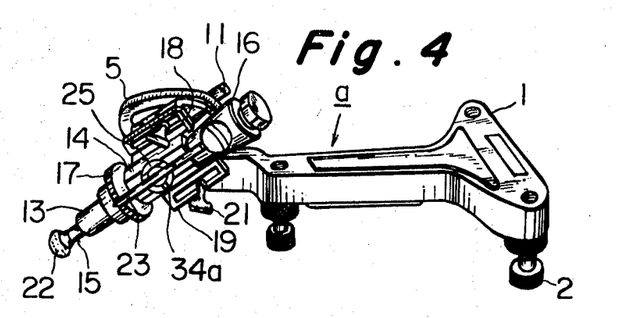
FIG. 4 is a perspective view of the faceting machine according to the present invention.

For standard brilliant cut, the zero lines of the cam follower graduations 18a and 19a are set to the reference positions, such as 18b. By doing so, shoulder portions 18d and 19d of the upper and lower cam followers 18 and 19 come in contact with the right-hand end 16" of the cam block 16, as seen in FIG. 3. The right-hand end 16" of the cam block 16 has a circular cross section.

It should be understood that the salient feature of the present invention is in using elliptic cross sections of the cam block 16, as will be described in detail hereinafter referring to oval cut. For the sake of explanation, standard brilliant cut is referred to here, but the advantage of the faceting machine becomes apparent only in non-standard cuts.

After setting the upper and lower cam followers 18 and 19, an operator rotates the faceter spindle 13 about the shaft 7 by his left hand, until the cam block 16 secured to the faceter spindle comes in contact with the shoulder portion 18d of the upper cam follower. The operator releases the angle setting nut 11 and turns the angle setting plate 6 about its hollow shaft 6a by rotating the pinion gear 10, until the reference line 26a of the pointer 26 meets the 90 degree line of the graduations 27 of the protractor 5.

Referring to FIGS. 5 and 6, when the operator depresses the right-hand end of the trigger 23 toward the faceter spindle 13 against the trigger spring 24, the left-hand end of the trigger 23 disengages from the index gear 17. At this moment, the trigger lifter 25 can be rotated about the trigger bolt 23a, so as to bring a mound portion 34 of the lifter 25 under the trigger 23. The mound portion 34 has a radial groove 34a on the upper surface thereof, and accordingly, the trigger can be fitted in such radial groove 34a upon release of the right-hand end thereof. With the trigger 23 thus fitted in the radial groove 34a, the faceter spindle 13 and the gemstone 22 mounted at the tip of the spindle 13 can be rotated about the axis of the spindle 13 by turning the knurled portion of the cam end by fingers.

Therefore, the operator can cut a circulator girdle by setting the pointer 26 to the 90 degree position of the protractor and rotating the faceted spindle about a horizontal axis by his left hand while urging the cam block 16 against the upper cam follower 18. The operator can firmly hold the faceting machine on the faceting table *d* (FIG. 5) by his right hand. The level of the faceter table, of course, should be properly adjusted to bring the gemstone 22 in contact with the lap *b* (FIG. 5).

Figure 7:
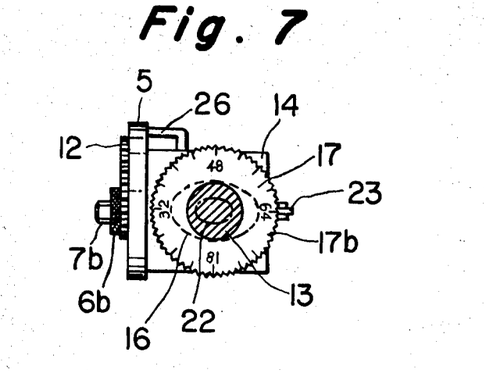
FIG. 7 is an end view taken from the direction of the arrows VII—VII of FIG. 6.

I(2) Table cutting.—The particular embodiment as illustrated in FIG. 7, the index gear 17 has 64 teeth cut on its periphery. By depressing the right-hand end of the trigger 23, the trigger lifter 25 can be disengaged from the trigger 23, and then the trigger 23 can be brought into engagement with the tooth 64 of the index gear 17, as shown in FIG. 7. With the trigger thus engaged with one of the teeth of the index gear 17, the faceter spindle 13 cannot rotate relative to the bearing 14, or about its own axis.

The number of teeth cut on the periphery of the index gear 17 is not restricted to 64, but any other suitable number of teeth can be used depending on the specific conditions of faceting machine application. For instance, the inventor found that 80 or 96 teeth can be used advantageously for certain applications.

The operator can make the faceter spindle 13 vertical by releasing the angle setting nut 11, rotating the pinion gear 10 along the sector gear 12 until the reference line 26a of the pointer 26 meets the 0 degree line of the graduations 27 of the protractor 5, and fastening the angle setting nut 11 there. The operator should preferably keep the cam block 13 urged against the upper cam follower 18 throughout the adjustment of the inclination of the faceter spindle 13.

The table 101 of the standard brilliant cut can be formed by regulating the level of the faceter table *d* while keeping the faceter spindle 13 at this angular position, for instance, by right hand thumb of the operator.

To ensure correct angle, the same procedure can be repeated wtih the trigger 23 engaged with the 32nd tooth of the index gear 17.

I(3) Main facet cutting.—The operator sets the pointer 26 to 42 degrees, while keeping the cam block 16 in contact with the lower cam follower 19. Eight main facets 102 with 42 degree inclination can be cut with the faceter spindle 13 kept at this position by adjusting the setting of the index gear 17 to its different teeth in the order of 64th—8th—16th—24th—32nd—40th—48th—56th.

I(4) Star facet cutting.—The operator sets the pointer 26 to 27 degrees, and eight star facets 103 with 27 degree inclination can be cut by adjusting the setting of the index gear 17 to its different teeth in the order of 4th—12th—20th—28th—36th—44th—52nd—60th.

I(5) Upper girdle facet cutting.—The operator sets the pointer 26 to 47 degrees, and sixteen girdle facets 104 can be cut by adjusting the index gear teeth in the order of 2nd—6th—10th—14th—18th etc.

I(6) Pavilion side facet cutting.—various facets on the pavilion side of the gemstone 22 can be cut in the similar manner after transferring it to another dop stick 15 by a known method.

II. Brilliant oval

In comparing FIG. 10A and FIG. 11A, it is apparent that the girdle 100' of brilliant oval cut is not circular but elliptic and that the inclination of main facets 102' is not the same for all of them, and the star facets and upper girdle facets have the same angular characteristics. With known faceting machine, the following laborious steps must be taken to cut different facets of brilliant oval.

(a) For cutting each of the facets of the same series, e.g., star facets, the cutting angle has to be adjusted and set separately.

(b) Preforming or rough shaping of the gemstone must be done by using a separate machine, e.g., a grinder, before cutting by the faceter.

(c) For table cutting, the gemstone must be transferred to a different dop stick, e.g., a 45° dop.

One of the main features of the faceting machine of the present invention is in the various non-standard cuts, such as different oval cuts, marquise cut, pendeloque cut, etc., can be done easily without resorting to the foresaid laborious and troublesome steps.

Referring to FIG. 3, the shape of the cam block 16 is such that its lateral cross section at the right-hand end 16" is circular, but the corresponding cross section at the left-hand end 16' is elliptic with a major axis identical in length with the diameter of the circle at the right-hand end 16" and a minor axis considerably shorter than the major axis. The length of the major axis is constant throughout the cam block, while the minor axis gradually varies from its maximum length at the right-hand end 16", where it is identical with the major axis, to its minimum length at the left-hand end 16' thereof. In the process of standard brilliant cut, as described in detail hereinbefore, the upper and lower cam followers 18, 19 are so set that their shoulder portions 18d and 19d engage the right-hand end 16″ of the cam block 16, and hence, the distance between the axis of rotation of the faceter spindle 13 and the cam follower shoulder 18d or 19d is constant regardless of the angular position of the faceter spindle 13 about its axis, as long as the cam block is urged against the cam follower shoulder 18d or 19d.

Figure 1:
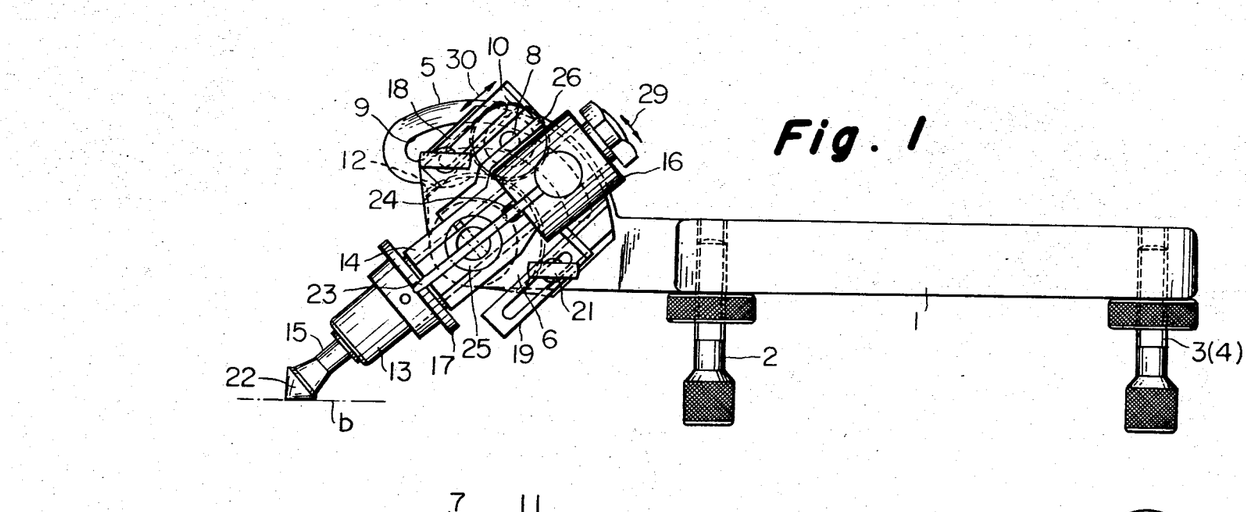
FIG. 1 is an elevation of a faceting machine according to the present invention.
Figure 1A:
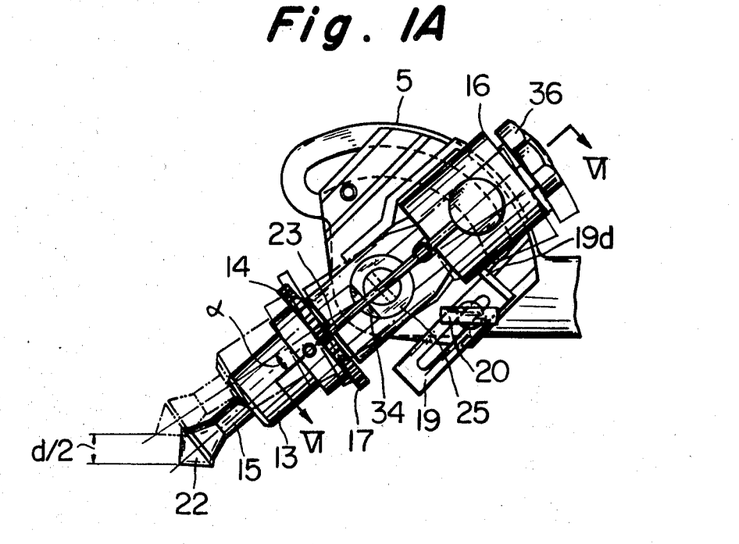
FIG. 1A is an enlarged partial elevation of the faceting machine, shown with its upper cam follower removed and its faceter spindle located at an inclined position.
Figure 2:
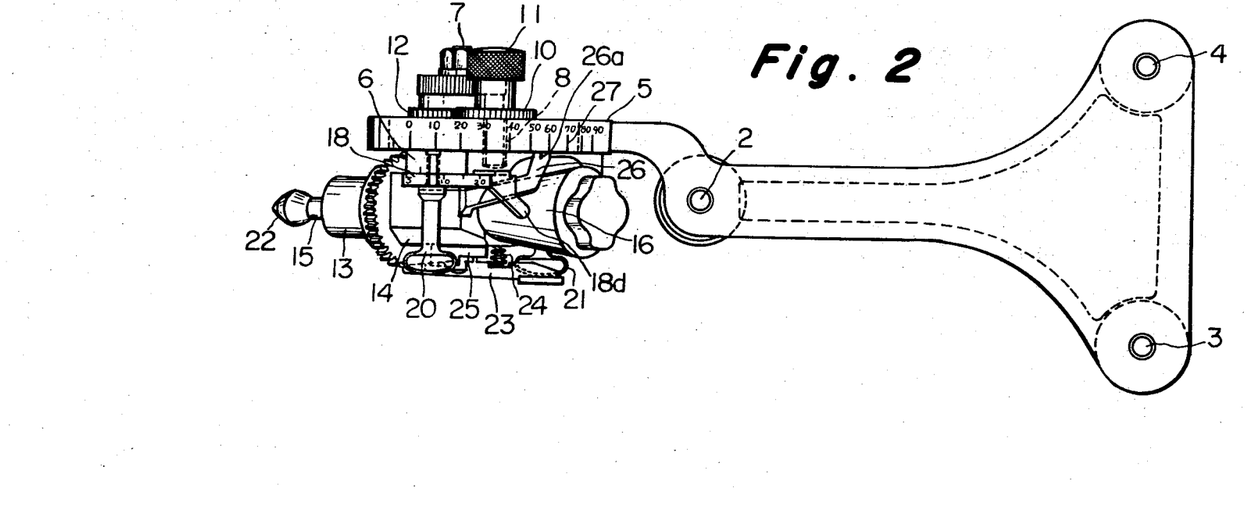
FIG. 2 is a plan view of the faceting machine.

Referring to FIG. 1A, if the lower cam follower 19 is shifted leftwards, as seen in the figure, its shoulder 19d becomes engageable with a longitudinally intermediate portion of the cam block 16, where its lateral cross section is elliptic. If the faceter spindle 13 is rotated about its own axis while being urged against the cam follower shoulder 19d, the distance between the axis of the faceter spindle 13 and the shoulder 19d varies from a maximum value, as shown in solid lines in the figure, to its minimum value, as shown in dash-dot lines in the figure. Since the shoulder 19d of the lower cam follower 19 and the axis of the shaft 7 holding the faceter spindle 13 are fixed relative to the protractor 5 under the present conditions, the faceter spindle 13 swings about the shaft 7 by an angle α as the distance between the axis of the faceter spindle 13 and the lower cam follower shoulder 19d varies. As a result, the tip of the gemstone 22 moves by a distance d/2, as shown in FIG. 1A. It is apparent that similar swing of the faceter spindle 13 takes place when the cam block 16 is urged against the upper cam follower shoulder 18d. The value of d, representing the height difference between the highest and the lowest positions of the gemstone 22 during a full rotation of the faceter spindle 13, varies in response to the change in the position of the cam follower shoulder 18d or 19d relative to the cam block 16, which is designated by graduations, e.g., 18a (FIG. 3), to be read out by a reference mark on the angle setting plate 6, e.g., 18b (FIG. 3).

Figure 8:
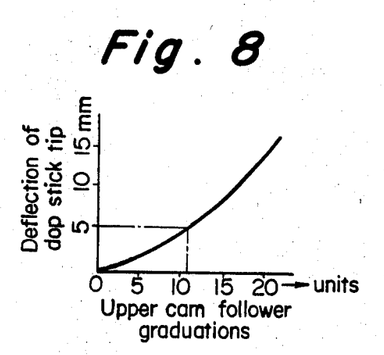
FIG. 8 is a graph, showing the deflection of the tip of a dop stick for different settings of an upper cam follower.
Figure 9:
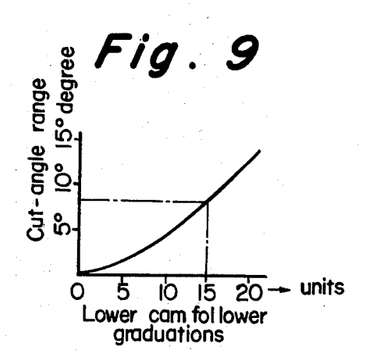
FIG. 9 is a graph, showing the deflection of the inclination of a faceter spindle for different settings of a lower cam follower.

FIG. 8 shows the relation between the height difference d of the gemstone 22, as defined above, and the graduations of the upper cam follower 18 in the illustrated embodiment. FIG. 9 shows the relation between the swing angle α, as defined above, and the graduations of the lower cam follower 19.

Prior to the start of the actual cutting operation, the trigger 23 is brought into engagement with the 64th tooth of the index gear 17, and the gemstone 22 and the cam block 16 are so secured to the faceter spindle 13 that the major axis of the gemstone 22 and the major axis of the cam block 16 are aligned with a diameter of the index gear 17 passing the 64th tooth, as shown in FIG. 7.

II(1) Girdle cutting.—Let it be assumed that the girdle 100′ of the brilliant oval cut of FIG. 11A is an ellipse with a 20 mm. long major axis and a 15 mm. long minor axis. In this case, the difference between the major axis and minor axis is 5 mm. (=20—15), and accordingly, referring to FIG. 8, the graduation 18a of the upper cam follower 18 is set at 11. It should be noted here that the distance d shown in FIG. 8 represents approximate values. By lowering the faceter table d to a suitable level, and by turning the knurled portion of the cam end while urging the cam block 16 against the upper cam follower shoulder 18d, the operator can cut the oval girdle of the gemstone 22. The pointer 26 should, of course, be adjusted to cause the reference line 26a to meet 90 degree line of the graduations 37 with the trigger 23 set at the 64th tooth of the index gear 17, with the cam block 16 urged against the upper cam follower shoulder 18d. During the girdle cutting, the trigger 23 should be kept away from the index gear 17 by the trigger lifter 25.

II(2) Table cutting.—It is apparent to those skilled in the art that the table 101′ of the brilliant oval cut of FIG. 11A can be cut in the same manner as that of the standard brilliant cut of FIG. 10A, which has been described in detail hereinbefore referring to FIGS. 1A, 6 and 7.

II(3) Main facet cutting.—Referring to FIG. 11A, the maximum difference in the inclination of the main facets is 8 degrees (=42—34). It is seen from FIG. 9 that the setting of the lower cam follower 19 should be about 15 for producing the angular difference of 8 degrees.

The index gear 17 is set at the 64th tooth by the trigger 23, and then the pointer reference line 26a is set at the 42 degree line in the graduations 27 of the protractor 5. The cutting angle should be checked to be 42 degrees at the 64th tooth of the index gear 17, and to be 34 degrees at the 16th tooth of the index gear, while keeping the cam block 16 in contact with the lower cam follower 19. If such angular relations are not established, the setting of the lower cam follower 19 should be adjusted until the relations are established.

Figure 12:
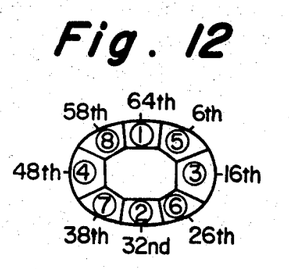
FIG. 12 is a simplified diagrammatic illustration, indicating the order of cutting or polishing different main facets in the brilliant oval cut.

Two main facets 102′ of 42 degree inclination can be cut with the trigger 23 set at the 64th and 32nd teeth of the index gear 17, respectively; and two main facets 102′ of 34 degree inclination can be cut with the trigger 23 set at the 16th and the 48th teeth of the index gear 17, respectively; and four main facets of 39.5 degree inclination can be cut with the trigger 23 set at the 6th, 26th, 28th, and 58th teeth of the index gear 17, respectively. FIG. 12 shows the sequence of the aforesaid cutting of eight different main facets with the faceting machine of the present invention.

Thus, all the cutting angles of the main facets are set automatically, in response to the rotation of the faceter spindle 13 while urging the cam block 16 against the lower cam follower 19. This is one of the most important features of the faceting machine of the present invention.

II(4) Star facet cutting.—The pointer reference line 26a is set at the 26 degree line of the graduations 27 of the protractor 5, while holding the trigger 23 engaged with the 3rd tooth of the index gear 17.

Four star facets 103′ of 26 degree inclination can be cut with the trigger 23 set at the 3rd, 61st, 29th, and 35th teeth of the index gear 17, respectively; and the remaining four star facets 103′ of 20.5 degree inclination can be cut with the trigger 23 set at the 11th, 21st, 43rd, and 53rd teeth of the index gear 17, respectively.

In this case, it should be noticed that the desired angular relations of the star facets can be automatically achieved simply by rotating the faceter spindle 13 to different teeth of the index gear 17 while urging the cam block 16 against the lower cam follower 19, without necessitating none of modification of the setting of the cam followers 18 and 19 and resetting of the angular position of the angle setting plate 6.

II(5) Upper girdle facet cutting.—The pointer reference line 26a is set at the 47 degree line of the graduations 27 of the protractor 5, while holding the trigger 23 engaged with the 2nd tooth of the index gear 17. Then, different cutting angles for the upper girdle facet 104′ can be automatically set as follows. Namely 46 degrees at the 4th tooth of the index gear 17, 43.5 degrees at the 8th index gear tooth, and 40 degrees at the 13th index gear tooth.

In other words, four upper girdle facets 104′ of 47 degree inclination can be cut, with the trigger 23 set at the 2nd, 62nd, 30th and 34th teeth of the index gear 17, respectively; four upper girdle facets 104′ of 46 degree inclination can be cut with the trigger 23 set at the 4th, 60th, 28th, and 36th teeth of the index gear 17, respectively; four upper girdle facets 104′ of 43.5 degree inclination can be cut with the trigger 23 set at the 8th, 56th, 24th, and 40th teeth of the index gear 17, respectively; and four upper girdle facets 104′ of 40 degree inclination can be cut with the trigger 23 set at the 13th, 19th, 45th, and 51st teeth of the index gear 17, respectively.

II(6) Pavilion side facet cutting.—Various facets on the pavilion side of the gemstone 22 can be cut in the similar manner after transferring it to another dop stick 15 by a known method.

In the example described above, the standard or oval cut is explained in detail. It should be understood here that the faceting machine of the present invention can be also used for various other forms of cutting, such as marquise and emerald. The configuration of the cam block 16 can be easily modified to suit for cutting and polishing other gemstone configurations. In short, it is an important feature of the present invention that the inclination of each facet being polished or cut, such as main facet and star facet, is automatically adjusted simply by turning the index gear 17, after the angle setting plate 6 is set. The combination of the fixed sector gear 12 and the pinion gear 10 facilitates the setting of the angle setting plate 6, and more particularly, by turning the pinion gear 10, fine adjustment of the setting of the angle setting plate 6 can be carried out very accurately and easily. It is another feature of the faceting machine of the present invention that it can be used both for pre-forming of a gemstone, as well as for polishing it.

Furthermore, it is apparent to those skilled in the art that various cabochons can also be cut and polished with the faceting machine of the present invention, by repeating the procedure similar to the aforesaid girdle cutting while gradually modifying both the angular position of the angle setting plate 6 and the level of the horizontal faceter table $d$.

What is claimed is:

1. A faceting machine, comprising a faceter frame; at least three adjustable legs threadedly engaging said faceter frame; a protractor issuing from a corner of the faceter frame and consisting of a vertical plate, said protractor having a horizontal shaft hole perpendicular to said vertical plane and graduations indicating angles from a vertical passing the axis of the shaft hole; an angle setting plate having a hollow shaft secured thereto and extending coaxially through said shaft hole of said protractor, said angle setting plate being rotatable about said axis of said shaft hole; a fastening means to selectively fasten said angle setting plate at a selected angular position; a faceter spindle rotatably carried by a bearing block; a shaft secured to said bearing block at right angles with said faceter spindle and coaxially fitted in said hollow shaft of said angle setting plate, said faceter spindle being rotatable about the axis thereof and swingable on a vertical plane about said shaft of said bearing block; a dop stick axially secured to said faceter spindle at one end thereof in a detachable manner; a cam block having a circular cross section at one end thereof and non-circular cross section at other portions thereof, said cam block being secured to the opposite end of said faceter spindle in axial alignment with said spindle; a cam follower means securable to said angle setting plate and having a shoulder portion engageable with the peripheral surface of said cam block, said cam follower means being movable substantially in parallel with said faceter spindle; an index gear laterally secured to said faceter spindle; and an index gear holding means for selectively holding said faceter spindle at a selected angular position relative to the axis thereof.

2. A faceting machine, comprising a faceter frame; at least three adjustable legs threadedly engaging said faceter frame; a protractor issuing from a corner of the faceter frame and consisting of a vertical plate, said protractor having a horizontal shaft hole perpendicular to said vertical plane and graduations indicating angles from a vertical passing the axis of the shaft hole; an angle setting plate having a hollow shaft secured thereto and extending coaxially through said shaft hole of said protractor, said angle setting plate being rotatable about said axis of said shaft hole; a faceter spindle rotatably carried by a bearing block; a shaft secured to said bearing block at right angles with said faceter spindle and coaxially fitted in said hollow shaft of said angle setting plate, said faceter spindle being rotatable about the axis thereof and swingable on a vertical plane about said shaft of said bearing block; a dop stick axially secured to said faceter spindle at one end thereof in a detachable manner; a cam block having a circular cross section at one end thereof and non-circular cross section at other portions thereof, said cam block being secured to the opposite end of said faceter spindle in axial alignment with said spindle; a cam follower means securable to said angle setting plate and having a shoulder portion engageable with the peripheral surface of said cam block, said cam follower means being movable substantially in parallel with said faceter spindle; an index gear laterally secured to said faceter spindle; an index gear holding means for selectively holding said faceter spindle at a selected angular position relative to the axis thereof; an arcuate slot bored through said protractor with a center of curvature lying on the axis of said shaft hole; a sector gear secured to said protractor and having a center pitch circle lying on said axis of said shaft hole, an adjusting pin issuing from said angle setting plate and extending through said arcuate slot of said protractor; a pinion gear rotatably mounted on said adjusting pin and meshing said sector gear; and an angle setting nut mounted on said adjusting pin and capable of fastening said angle setting plate to said protractor at a desired angular position.

3. A faceting machine according to claim 1, wherein said angle setting plate is swingable from a position corresponding to a vertical position to another position corresponding to a horizontal position.

4. A faceting machine according to claim 1, wherein said index gear holding means consists of a trigger pivotally secured to said bearing block and selectively engageable with said index gear for holding said faceter spindle at a selected angular position relative to the axis thereof.

5. A faceting machine according to claim 1, wherein said cam follower means consists of a first cam follower movably secured to said angle setting plate and engageable with one side surface of said cam block, and a second cam follower movably secured to said angle setting plate and engageable with the opposite side surface of said cam block.

6. A faceting machine according to claim 1, wherein said cam block is replaceably secured to said faceter spindle.

7. A faceting machine according to claim 1, wherein said faceter frame is triangular and has said adjustable legs threadedly secured to each corner thereof, and said protractor issues from one corner thereof away from the faceter frame.

References Cited

UNITED STATES PATENTS 2,527,592   10/1950   Spira _______________ 51—229X
3,135,073   6/1964   Odle _______________ 51—229

TRAVIS S. McGEHEE, Primary Examiner